United States Patent [19]

Gibby et al.

[11] 4,326,953

[45] Apr. 27, 1982

[54] DEVICE FOR REMOVING CONTAMINATING PARTICLES FROM LUBRICATING OIL

[76] Inventors: Richard A. Gibby, 37 Willshire Dr., Tinton Falls, N.J. 07224; Stanley B. Potter, 4 Ellen Ct., Wayside, N.J. 07712

[21] Appl. No.: 153,087

[22] Filed: May 27, 1980

[51] Int. Cl.³ .............................................. F01M 1/10
[52] U.S. Cl. .................... 210/168; 210/304; 210/521; 208/182; 184/6.24
[58] Field of Search ............... 210/801, 802, 167, 168, 210/521, 522, 304, 320; 123/196 A; 208/182; 184/6.24

[56] References Cited

U.S. PATENT DOCUMENTS

| | | | |
|---|---|---|---|
| 1,693,471 | 11/1928 | Weinberg | 210/168 |
| 2,207,399 | 7/1940 | Gaertner | 210/168 |
| 2,312,064 | 3/1943 | Thompson | 210/168 |
| 3,450,264 | 6/1969 | Graybill | 210/320 |
| 3,529,719 | 9/1970 | Graybill | 210/304 |
| 3,888,768 | 6/1975 | Graybill | 210/304 |
| 4,149,973 | 4/1979 | Harris | 210/521 |
| 4,151,823 | 5/1979 | Grosse et al. | 210/168 |

Primary Examiner—Benoit Castel
Attorney, Agent, or Firm—George H. Mortimer

[57] ABSTRACT

Contaminating particles in lubricating oil have a density higher than the density of the oil. The present invention provides a device for removing the contaminating particles by settling out the heavier particles and separating them from the oil.

The device comprises means to establish laminar horizontal flow and means to withdraw sinking particles vertically over the bottom surface of the horizontally flowing oil. In its preferred embodiment the device has a pressure tight cylindrical settling chamber over a hemispherical sump which are separated by a foraminous partition of elongated, slender vertical passages. Oil inlet means introduce oil diverted from the oil line of the lubricating system in vertically related horizontal streamlets into the oil in the separating chamber which flows horizontally through it over the foraminous partition where falling particles settle out and to outlet means where similar vertically related horizontal streamlets are removed to rejoin the oil stream from which it was diverted. The sump is provided with a pet cock to remove particle laden oil from time to time. An equal volume of clean oil is then added to the system.

The device is effective in keeping oil in good condition indefinitely and avoid periodic oil changes such as are required by the present practice of filtering.

11 Claims, 6 Drawing Figures

DEVICE FOR REMOVING CONTAMINATING PARTICLES FROM LUBRICATING OIL

INTRODUCTION

The present invention relates to a device for removing contaminating particles from lubricating oil. It is more particularly adapted for use in the lubrication system of a motor vehicle driven by an internal combustion engine, such as a passenger automobile, a truck, tractor and the like. It is characterized by the continuous removal of contaminating particles both during periods of vehicle operation and idle periods.

BACKGROUND OF THE INVENTION

Motor vehicles driven by internal combustion engines are well known. Such engines require lubrication to minimize wear of moving parts. In general the lubrication systems in motor vehicles of this type include a crankcase for holding a quantity of oil, an oil line for conducting oil from the crankcase to moving parts to be lubricated under pressure generated by an oil pump and for returning said oil to the crankcase, and a filter through which the oil in said line passes for the purpose of removing contaminants from it.

Under normal operating conditions the lubricating oil of an internal combustion engine tends to become contaminated with an accumulation of foreign material, which, if left in the oil, can be damaging to the engine. Small particles of solid material having dimensions ranging from 10 to 60 microns in diameter are of special concern, since they can do serious damage to the bearing surfaces of the engine. These may be bits of metal, carbon, sand, and other substances. Many patents have been issued on filters and centrifugal devices for use in oil lines of lubricating systems for the intended purpose of purifying the oil by removing contaminants and extending its useful life.

Filters operate on the principle of straining solid contaminants from the oil by some sort of sieve-like marterial through which all of the oil passes. An oil system including a filter has many inherent disadvantages. One disadvantage is that liquid contaminants such as water and acid are not removed. Another is that the pores in the filter material become clogged with contaminants during usage so that the filter ceases to function and has to be replaced periodically, usually when the oil itself has to be changed. Another disadvantage is the difficulty of filtering the oil when it is cold. See, for example, Clare U.S. Pat. No. 2,423,329 granted July 1, 1947.

Centrifugal devices have been proposed for use in lubricating systems which are described as setting up rapid circulatory motion of oil passing through them to cause contaminants to be thrown outwardly through the rotating oil by centrifugal force to form a contaminant-rich phase which is separated from the contaminant-poor phase which is returned to the system. See, for example, Graybill U.S. Pat. Nos. 3,450,264, granted June 17, 1969, 3,529,719 granted Sept. 22, 1970 and 3,888,768 granted June 10, 1975. Careful tests of a device constructed in accordance with the Graybill disclosures established that there was practically no removal of contaminating particles during the time oil was passing through the device. In other words, it is not effective in removing solid contaminants from the oil in a vehicle when the engine is running. While the reason for the failure of this device to operate as predicted in the patents is not definitely known, it is believed to be related to the turbulence and upward currents in the oil during its passage through the doughnut-shaped chamber of the device.

SUMMARY OF THE INVENTION

The present invention is based on the discovery that contaminants, both solid and liquid, which have higher density or specific gravity that the oil will settle from it while it is moving in horizontal laminar or streamline flow. The rate of settling is affected by particle density and size and by the viscosity of the oil but not by the velocity of horizontal flow as long as it is laminar and not turbulent. In applying this discovery in accordance with the present invention, oil is purified by moving it in laminar, horizontal flow and withdrawing sinking contaminating particles from the flowing oil along the bottom surface thereof into a contaminant-rich sludge. The contaminant-poor portion is recirculated to the lubricating system.

The device for carrying out the present invention will comprise means to establish horizontal laminar flow of the contaminated oil through a settling chamber and means to withdraw sinking particles from the flowing oil along the bottom surface thereof. Upward currents in the oil in the settling chamber are avoided by introducing the oil from the oil line into the chamber horizontally and by withdrawing oil from the chamber horizontally to be returned to the oil system. In order to avoid generation of turbulence by motion of the vehicle in which the device is used, the settling chamber is kept filled with oil under the pressure of the system. The rate of flow of oil in the settling chamber must be kept below the rate at which flow becomes turbulent. In order so to regulate the rate of flow of oil through the settling zone as to obtain laminar flow, a proper portion of the oil stream flowing through the lubricating system is diverted to pass through the contaminant-removing device while the remainder of the oil stream by-passes it. While this by-pass procedure does not subject the entire stream of oil to the cleaning process in passing through a single cycle, i.e., from crankcase back to crankcase, by continuing the operation over a period of time the level of contaminants in the entire active body of oil in the lubrication system is reduced to and maintained at such a low level that oil changes are unnecessary. The contaminant-rich sludge containing the particles that settle out and are collected in it is removed from the system from time to time and replaced by a comparable volume of fresh lubricating oil. In this manner the consumption of oil is drastically reduced and the life of the internal combustion engine is prolonged because of reduced friction and wear otherwise caused by the contaminating particles in the lubricating oil.

The present invention also contemplates removal of chemical impurities that may be formed in the lubricating oil by contacting the oil as it passes through the settling zone with metal that reacts with and precipitates the chemical impurities as more particularly described in Graybill U.S. Pat. No. 3,529,719. Such precipitates also settle out in the manner described for other contaminating particles that have higher density than the oil.

BRIEF DESCRIPTION OF THE DRAWINGS

The method and device of the invention will be described in conjunction with the accompanying drawings in which.

DETAILED DESCRIPTION OF THE DEVICE AND METHOD

The operation of the oil cleaning device of the invention is based on the principle that over a period of time, settling of contaminant particles in lubricating oil can be used effectively to keep the oil in the crankcase of the vehicle clean and usable. By keeping the oil free from contaminants its useful life is extended indefinitely. Lubricating oil is thus conserved in the vehicle and does not need to be discarded periodically, as present procedures require. Applying this invention to the large number of vehicles currently in operation would result in a very substantial economic saving, and a great reduction in the consumption of oil.

Figure 1:
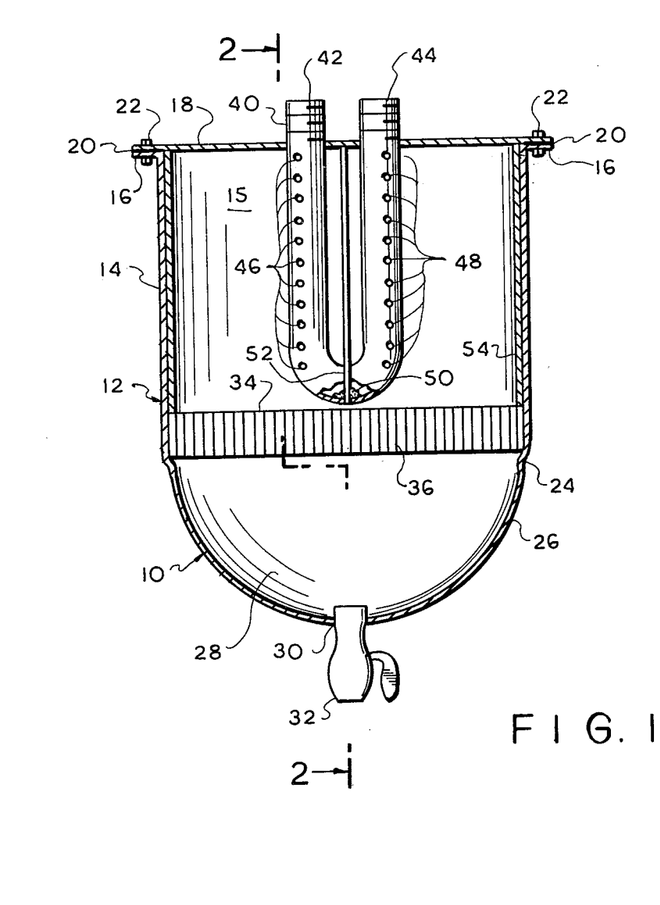
FIG. 1 is a vertical sectional view of a preferred embodiment of the present invention as viewed from the right side of FIG. 2 looking left, e.g., along the line 1—1 looking in the direction of the arrows.
Figure 2:
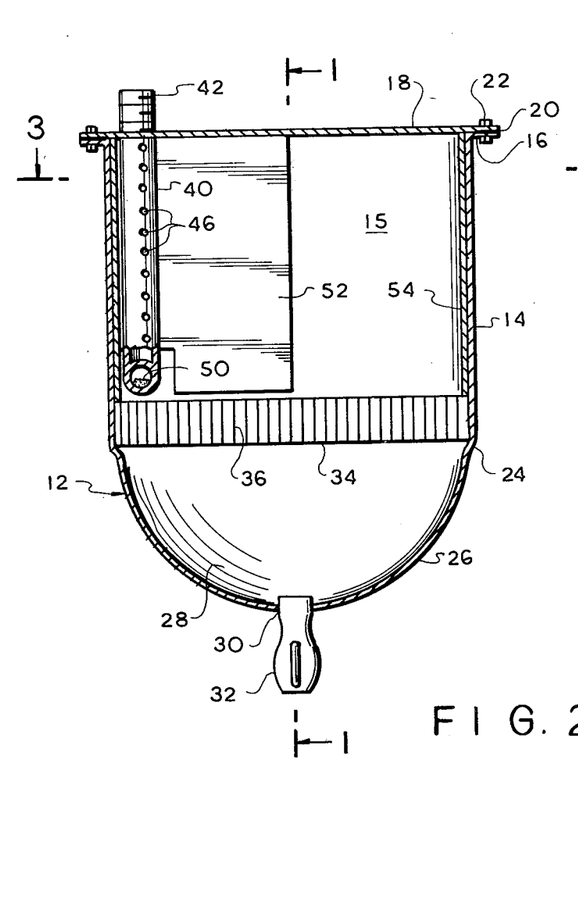
FIG. 2 is a vertical sectional view of the same embodiment as viewed from the left side of FIG. 1 looking right, e.g., along the line 2—2 looking in the direction of the arrows.
Figure 3:
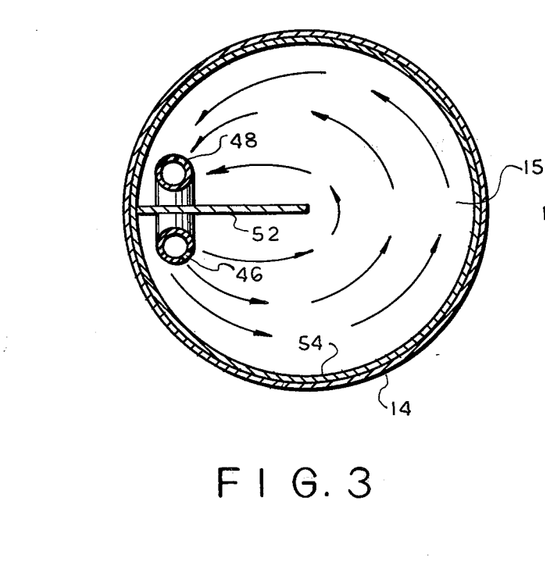
FIG. 3 is a horizontal sectional view through the settling chamber looking down on FIG. 2, e.g., along the line 3—3 looking in the direction of the arrows.

Referring first to FIGS. 1, 2 and 3 illustrating the preferred and best embodiment of the device of the invention presently known, the device represented generally by reference number 10 is intended for use in the oil line of the lubricating system for an internal combustion engine through which oil is pumped under pressure from the crankcase to the parts to be lubricated and then returned to the crankcase. The engine will generally be the prime mover for a vehicle such as a passenger automobile, bus, truck, tractor and the like. The lubricating system itself is not illustrated or described in greater detail because the device of the present invention may be used in any lubricating system regardless of the details of its construction provided only that it has an oil line through which oil is circulated under pressure by a pump.

The device 10 comprises a casing 12 having a cylindrical wall portion 14 forming an upper active chamber or settling zone 15. At the upper end of the cylindrical wall portion a flange 16 is formed to which a top plate or disc 18 may be suitably secured with an intermediate gasket 20 by bolts 22 to make a liquid tight casing capable of operating at substantially the same pressure as the oil in the line of the lubricating system in which the device is connected. Alternatively the top plate 18 may be welded to the upper end of wall 14. At the lower end of the cylindrical portion 14 is an inwardly directed shoulder 24 to which a hemispherical wall 26 is connected. The hemispherical wall forms a lower quiescent chamber or a sump 28 having an outlet 30 in the lowest portion thereof for receiving a petcock 32 through which the contaminant-rich oil or sludge can be removed from the system. This structure provides a pressure tight casing.

The casing 12 may be made from a single piece of metal by hydroforming in a suitable mold.

A foraminous partition 34 is provided to separate the upper active chamber or settling zone from the lower quiescent chamber or sump. It is circular in shape having an outer diameter corresponding substantially to the internal diameter of the cylindrical portion 14 and its periphery rests on the shoulder 24. The foraminous partition is characterized by having a plurality of vertically extending slender passageways 36 and provides means to withdraw sinking contaminating particles from oil in the settling chamber along the bottom surface thereof. An ideal material for this purpose is available commercially as a honeycomb of hexagonal walls which is available in various thicknesses. While the thickness of the foraminous partition is not critical, it should be at least thick enough to damp any motion in the oil in the settling zone so that the oil in the quiescent chamber is unaffected by the flow of the oil in the upper chamber. A thickness within the range of about $\frac{1}{2}$ to $\frac{3}{4}$ inch has been found to be completely satisfactory in practice.

The device is connected to the lubricating system of the engine by an oil pipe 40, preferably U-shaped, having an inlet end 42 and an outlet end 44. These ends may be threaded or otherwise adapted to be connected to an oil line in a lubricating system.

The pipe 40 is provided with means such as orifices 46 to pass oil from the pipe 40 horizontally into the active chamber 15 and with means such as orifices 48 to pass oil from the active chamber horizontally back into the pipe 40. Between means 46 and 48 the cross section of the passageway through the pipe 40 is reduced by means 50, for example, at the U bend in the tube. The means 50 may be in the form of a dent in the wall of the pipe, a valve, a plug or the like. The means 50 may be fixed or variable, as desired, but in either event it serves to partition the amount of oil in the stream entering at the inlet end 42 into a diverted portion that leaves the pipe by means 46 to pass through the settling chamber and a by-pass portion that flows through the pipe 40 without being subjected to the purification in the settling chamber 15. This is due to the fact that the obstruction tends to increase the pressure of the oil in the pipe 40 on the upstream side of it and this increased pressure is relieved by the flow of the diverted portion of the oil from the pipe 40 into the upper active chamber 15. The means 50 also reduces the pressure in the oil in the pipe 40 on the downstream side of it which permits the oil in the active chamber to return to the line through means 48. Depending on the height of the settling chamber, means 46 may be anything from a single orifice located at any position within the chamber on the upstream side of means 50 to a plurality of orifices and means 48 may likewise be anything from a single orifice any place in the pipe downstream from the means 50 to a comparable plurality of orifices. In order, however, to minimize any currents in the oil in the upper active chamber 15 other than the horizontal flow or motion, means 46 and 48 preferably comprise a series of vertically related orifices to pass the diverted oil horizontally into the settling chamber as a plurality of vetically related streamlets. This series of vertically related orifices may be in a single line or they may be located somewhat randomly along the pipe in approximately a 90 degree arc as described more in detail hereafter.

A baffle 52 is provided which extends from the wall 14 radially inwardly any desired distance but preferably approximately to the axis of the cylindrical chamber 15 between the arms of the U-shaped pipe 40 as clearly seen in FIGS. 1, 2 and 3. The U-shaped tube 40 straddles the outer end of the baffle 52 and each leg of the tube occupies a position near the intersection of the baffle with the wall 14. This leaves an arc of about 90 degrees of the wall of each leg of the pipe 40 facing the liquid in the active chamber and it will be apparent that the orifices 46 and 48 may be located anywhere within that arc and still direct streamlets of oil into and from the settling zone without causing sudden reversals in the direction of flow of the oil in the settling zone 15.

If it is desired to provide means for removing chemical contaminants from the oil, a metal or alloy liner 54 may be provided on the inner wall of cylinder 14 of any desired height and the radial baffle 52 may be made of or coated with metal or alloy of suitable composition for this purpose. Magnesium, aluminum, tin, zinc, copper, manganese, sodium, potassium, calcium and alloys thereof are useful in neutralizing acids and controlling gums and resins. In general, magnesium is a preferred material for the liner 54 and the baffle 52 or a coating thereon. Such a liner may be defined as an acid-reactive metallic liner.

Referring now to FIG. 3, it will be seen that oil flows out of orifices 46 of the pipe 40 as streamlets into the active chamber 15 in which the oil flows from the inlet side to the outlet side in a generally rotational motion. The oil flow is confined to a horizontal plane, i.e., there is no substantial vertical motion of the oil in the active chamber and it follows a path that is somewhat elliptical in shape around the baffle 52 to the outlet orifices 48 in the pipe 40. The oil flow in the active chamber is therefore laminar or streamline in that there is essentially no turbulent motion in the oil. As the oil flow out of orifices 46 of the pipe 40 and circulates through the active chamber, the flow lines diverge in a horizontal plane during the first half of the rotational motion. The flow lines continue around the chamber and pass between the central or inner edge of the baffle 52 and the wall 14 diametrically opposite to the baffle. The oil flow then converges in the same horizontal plane during the second half of the rotation and enters the holes 48 in the discharge side of the U-shaped pipe 40 which is positioned on the opposite side of the baffle 52 adjacent to the wall 14 of the chamber. The flow pattern is substantially the same for every horizontal cross-section throughout the active chamber. Due to the lower pressure within the pipe 40 on this outlet side, caused by the partial obstruction 50, the partially cleaned oil enters the pipe 40 through the orifices 48 and flows upwardly and out of the device into the oil line of the lubricating system (not shown) to which end 44 is connected as previously described.

The operation that has been decribed allows contaminants to be removed from the oil by sedimentation while the engine is running. This is accomplished through the particular pattern of oil flow produced by the structure of the device which avoids upward currents in the oil, and the absence of anything in the active chamber that causes turbulence or abrupt changes in the direction of flow of the oil. This flow pattern permits the maximum number of sinking contaminant particles to be withdrawn from the flowing oil along the bottom surface thereof and to be deposited in the sump through the elongated vertically directed slender passageways in the partition between the active chamber and the sump. Since the flow of the oil is nonturbulent and has no vertical component of motion while in the active chamber 15, the settling rate of contaminants is the same at the time the engine is running and the oil is flowing as it would be if the oil were standing quiescent. As the contaminants settle to the bottom of the active chamber the foraminous partition allows them to pass through without hindrance into the quiescent chamber. Once the contaminants enter the quiescent chamber they are trapped and remain there until such time as the resulting sludge is removed through the drain cock at the bottom of the device.

An analysis of the operation of a device of the invention is helpful in understanding and applying the principle thereof in vehicles of different sizes and under different operating conditions. In this analysis an oil cleaning device of the structure illustrated in FIGS. 1, 2 and 3 is used in which the settling chamber 15 is about 6Δ in diameter and 4" high. This device has a capacity and configuration suitable for operation in a passenger car size vehicle and is assumed to be operating in the lubrication system of the vehicle. The principles of this analysis can be applied to larger vechicles, such as trucks, if size and capacity are taken into account. The physical laws relating to the settling of solid particles in a fluid are used to calculate the rate at which particles are removed from the oil in the lubrication system. These results show that the performance of the device, in terms of its oil cleaning capability is satisfactory in that the oil is suitable for continual use in the vehicle. In this analysis several simplifying assumptions are made: The settling times for particles in oil are taken from values published in Standard Handbook of Lubrication Engineering, J. J. O'Connor and J. Boyd, McGraw Hill, 1968, pages 25–35. While the oil considered is not identical with that used in automotive vehicles, the physical properties of this oil are close to and representative of those of automotive lubrication oil. Only the settling of sand particles is considered. Other kinds of contaminant particles (usually heavier than sand) are encounterd in automotive lubrication systems. However, the performance of the device for sand type contaminant particles will be used as a conservative bound on actual operation. Also, in order to simplify the analysis, it is assumed that the contaminant particles have spherical shapes.

An object immersed in a viscous fluid is subject to both bouyant and gravitational forces. For slow flow conditions (Reynolds number less than one), Stokes law gives the quantitative expression for the net vertical force on a spherical object having a density greater than that of the fluid surrounding it. Such an object will be accelerated downward until the gravitational force is balanced by the viscous forces that arise as the object moves through the fluid. At this point the object will continue to move downward at its terminal velocity. The terminal velocity of a spherical particle in a fluid can be determined from the expression:

$$V_t = \frac{2r^2g}{9\eta}(\rho - \rho') \qquad (1)$$

where r is the radius of the sphere, $\eta$ is the viscosity of the fluid, $\rho$ is the density of the particle, $\rho'$ is the density of the fluid and g is the gravitational constant. $V_t$ is independent of the flow rate of the oil in the settling chamber as long as it is free of turbulence and up currents.

The terminal velocity thus determined can be used to ascertain the time required for a particle of a given size and density to fall a specified distance through a given fluid. Examples of the times involved in this settling process have been calculated, and are stated in Table I. The settling times given in this table were determined by calculations using equation (1), based on sand particles falling through 150-SSU turbine oil at 130 degrees F.

TABLE I

| Particle Diameter Microns | Order of Size | Time to Settle Through One Foot |
| --- | --- | --- |
| 1 | Fine Dust | 2 Months |
| 10 | Silt | 15 Hours |
| 100 | Fine Sand | 9 Minutes |
| 1000 | Coarse Sand | 4 Seconds |

For a passenger car containing four quarts of oil in the crankcase, the oil cleaning device mentioned above which has an active chamber about 6 inches in diameter and 4 inches in height, contains approximately two quarts of oil and the sump or settling chamber contains approximately one quart. The oil in the sump does not flow, but remains as a quiescent medium for collecting the contaminant particles. Thus about six quarts of oil circulate through the lubrication system of the vehicle. Under the assumption that oil flows through the system at a rate of approximately 15 quarts per minute, the total oil flowing in the system (6 quarts) will pass through the oil cleaning device every 0.4 minute. During this time the oil in the active chamber is circulating around the chamber in a slow, laminar, horizontal flow pattern and contaminant particles within the oil are settling out of the active chamber into the sump chamber where they are trapped.

The rate at which particles are removed from the oil stream varies according to the size of the particle. During one cycle (the time required for the total volume of oil in the system to pass through the device) a certain quantity of contaminant particles is removed from the oil stream and thus a fractional volume of the oil in the active chamber is cleaned. This fractional volume is equal to the product of the area of the active chamber and the distance through which a given size particle falls in the time required for all of the oil in the system to pass through the device (i.e., 0.4 minute).

In Table II the terminal velocities for various size particles are given, as well as the distance each size particle would settle in 0.4 minute. Also, the resultant volume that would be cleaned of particles of different sizes in one cycle of oil flow is given.

TABLE II

| Particle Diameter (microns) | Terminal Velocity (in./min.) | Distance Settled in One Cycle of 0.4 min. (inches) | Volume of Oil Cleaned - $Q_o$ (cubic inches) | Beta Ratio ($\beta$) |
| --- | --- | --- | --- | --- |
| 10 | 0.0133 | 0.00533 | 0.1518 | 1.00044 |
| 15 | 0.0300 | 0.0120 | 0.3393 | 1.00098 |
| 20 | 0.0533 | 0.0213 | 0.6023 | 1.00174 |
| 30 | 0.1200 | 0.0480 | 1.3572 | 1.00393 |
| 40 | 0.2087 | 0.0835 | 2.3610 | 1.00686 |
| 50 | 0.3288 | 0.1315 | 3.7181 | 1.01085 |
| 60 | 0.4650 | 0.1860 | 5.2590 | 1.01541 |

A standard measure of the capability of a device to clean oil is known as the Beta ($\beta$) ratio. This quantity is defined as the ratio of the number of particles greater than size $\mu$ in the influent fluid to the number of particles greater than size $\mu$ in the effluent fluid, where $\mu$ is the diameter of a particle. The higher the Beta ratio the greater the capability of the device to remove contaminant particles from the oil stream. For a Beta ratio of 2, one half of the particles of a given size are removed when all of the oil in the system passes through the device once. A Beta ratio of one means that no cleaning of the oil takes place.

If we let $N_{in}$ = number of contaminant particles of diameter greater than $\mu$ in the influent fluid and $N_o$ = number of contaminant particles of diameter greater than $\mu$ in the effluent fluid then $$\beta = \frac{N_{in}}{N_o} = \frac{N_{in}}{N_{in} - N_s} \qquad (2)$$

Where $N_s$ is the number of contaminant particles that are collected in the sump.

If prior to the cleaning process the contaminant particles are distributed uniformly throughout the oil in the system, it is possible to express the Beta ratio in terms of volumes of oil as follows:

$$\beta = \frac{Q_{in}}{Q_{in} - Q_c} \qquad (3)$$

where $Q_{in}$ is the volume of oil flowing in the system (i.e., 6 quarts or 346.5 cubic inches in this case) and $Q_c$ is the volume of oil cleaned in one pass of the oil through the device (i.e., the values given in Table III). The resultant values of the Beta ratio for the device can then be calculated using Equation 3. These values are given in the right hand column of Table II.

The values of the Beta ratio given in Table II are small compared to those of a new conventional porous type filter, especially for the smaller size particles. It is important to ascertain how well a device with low Beta ratio values will perform on an automotive vehicle, particularly over a long period of time. This can be done by examining the operation of a simplified lubrication system which consists of a crankcase of an internal combustion engine connected to the oil cleaning device and a pump which causes the oil to circulate. In this arrangement, contaminant particles are being added to the oil continuously by operation of the engine. Also, particles are being trapped continuously in the sump of the oil cleaning device. The condition of the oil, i.e., the concentration of contaminants in the oil, resulting from these two effects can be determined in terms of $\beta$ and n, the number of times the oil cycles through the system.

The important thing is that the resulting contaminant level has a limiting value as n becomes large. This limiting value can be shown to be the ratio $\beta/(\beta-1)$. This means that as the number of cycles increases, the oil in the system eventually reaches a point where contaminants are being removed at the same rate as they are being added. Thus, the contaminant concentration in the system reaches a constant value.

Table III gives the limiting value for various values of $\beta$ which varies with particle size.

TABLE III

| $\beta$ | $\dfrac{\beta}{\beta-1}$ |
|---|---|
| 1.00025 | 4001 |
| 1.0005 | 2001 |
| 1.001 | 1001 |
| 1.002 | 501 |
| 1.005 | 201 |
| 1.01 | 101 |
| 1.02 | 51 |

The significance of these results can be illustrated by considering an example. For $\beta=1.005$, the oil never has a contaminant concentration greater than 201 times the number of contaminant particles added to the system each cycle. For a properly functioning engine, the number of particles added per cycle is fairly low. Therefore the total number of contaminant particles never rises to any significant level.

This is a remarkable and previously unforeseen result. It gives an explanation for one of the great benefits of the invention that if oil is clean to start with and if the engine is operating properly, then even with a rather low Bet ratio, this device is effective in keeping the oil clean indefinitely. Oil is just as clean after 200,000 miles of use as it is after 200 miles. The oil cleaning capacity of the device of the invention is sufficient to keep clean oil in the system continuously.

The above analysis has been carried out with the assumption that the vehicle engine is operating continuously. For automotive vehicles this is not the normal operating condition. Generally, there are periods when the engine is off for several hours, overnight or for a number of days. During these periods, when oil is not flowing in the system, the process of oil cleaning continues until all the contaminant particles are removed from the active chamber. From the data in the first two columns of Table II the times required for various size particles to settle a distance of 4 inches (the height of the active chamber) can be calculated. For example, all the 10 micron size particles in the active chamber would be removed in five hours. Larger size particles would be removed in less time. Thus, after a period of five hours or longer with the engine turned off, the two quarts of oil in the active chamber are essentially cleaned from contaminants. When the engine is turned on again the two quarts of clean oil (one third of the total oil in the system) are reintroduced into the oil stream.

For the conditions that have been described, the device will operate during both the running time and the off time to give a combined cleaning capability better than that achieved during operation alone or off time alone. The condition of the oil in the system may be improved by reintroducing from time to time (i.e., after periods of non use) clean oil amounting to one third of the system capacity, since the resulting contaminant level will be reduced.

As stated above, the fractional volume of oil cleaned in the active chamber 15 in one cycle is equal to the product of the area thereof and the distance through which the particles of various size fall in the time required for all the oil in the system, except for that in sump 28, to pass through the device. For passenger size vehicles the 6 inch diameter active chamber is a desirable and effective size. For larger vehicles with more oil in the lubricating system the diameter of the active chamber 15 of the device of the invention for use in them can be appropriately increased approximately proportional to the respective volumes of oil in the systems. The height of the active or settling chamber is not critical. Preferably it should be at least equal to the distance through which a 60 micron diameter particle falls in the time of one cycle, which Table II shows to be about 0.2 inch for the 0.4 minute cycle. The 4 inch height for the active chamber for the device for passenger size vehicles was selected because it gave a volumetric capacity to chamber 15 equal to about $\frac{1}{3}$ of the volume of moving oil in the system, which is a satisfactory and preferred ratio. For devices to be used in vehicles of different volumes of oil in the lubrication systems, comparable heights of the settling chamber may readily be calculated by applying the principles explained above. The number of orifices 46 and 48 in the inlet and outlet portions of pipe 40 will depend on the height of the settling chamber. For the minimum height a single orifice may suffice but for a 4 inch height a spacing of about $\frac{3}{8}$ inch between orifices is desirable over the length of each leg of pipe 40. This structure provides means to introduce oil to be cleaned and to withdraw partially cleaned oil without substantial upward currents or turbulence in the settling chamber so as to obtain horizontal laminar flow.

Periodically or when desired the sludge is drained from the quiescent chamber 28 to make room for additional contaminants to be removed. When the sludge is removed through the pet cock 32 in the bottom of the device an equal volume of oil is added to the lubricating system of the engine.

From the method carried out by the apparatus of the invention, it will be seen that it comprises the removal of contaminating particles from lubricating oil which is circulating as a stream in the lubrication system of the machine, such as an internal combustion engine. In its broadest aspect it comprises moving oil horizontally by laminar flow and withdrawing sinking contaminating particles vertically from the moving oil over the lower surface thereof. More particularly it comprises diverting a small fraction of the oil stream and passing this diverted fraction horizontally in laminar flow from an inlet to an outlet of a settling zone over a surface comprising a plurality of vertically extending slender passageways above an oil sump. The ratio of the diverted oil to the circulating stream of oil in the lubricating system is not critical and may vary from a few percent to as high as 25 to 35 or even 50 percent of the volume of the entire stream, depending upon the area of the upper active chamber. In the lubricating systems of passenger automobiles a diameter of the upper active chamber of about 6 inches and a height of about 4 inches gives satisfactory separation when the percentage of the oil diverted from the oil stream is about 10% or less, i.e., 90% or more by passes the settling chamber in any cycle. In any event, the velocity of horizontal flow in the settling chamber is such as to insure laminar flow so that contaminating particles in the oil are allowed to sink through the laminar flowing oil into the passageways and thereby be removed from the horizontally flowing oil. At the end of its passage through the active chamber the horizontally flowing partially cleaned oil passes from the settling zone through outlet orifices 48 into the pipe 40 where it rejoins the stream from which it had been diverted.

Preferably the diverted fraction of oil is passed into and from the settling zone as a plurality of vertically related streamlets, and the structure described above provides means for doing this. This arrangement of means for producing the inlet and outlet streams avoids the necessity for or the production of vertical components of flow in the oil at any place within the settling zone. The oil in the settling zone is at substantially the same pressure as the oil in the main oil line of the lubricating system. Thus the oil pressure in the settling chamber adjacent to the inlet pipe is only slightly lower than the pressure in the pipe due to the very slight pressure drop through the orifices 46 and the oil pressure in the settling chamber adjacent to the outlet pipe is only slightly higher than the pressure of the oil in the pipe by reason of the pressure drop through the outlet orifices 48. The oil which fills the sump and the slender vertical passageways is also at substantially the same pressure as the oil in the lubricating system.

Figure 4:
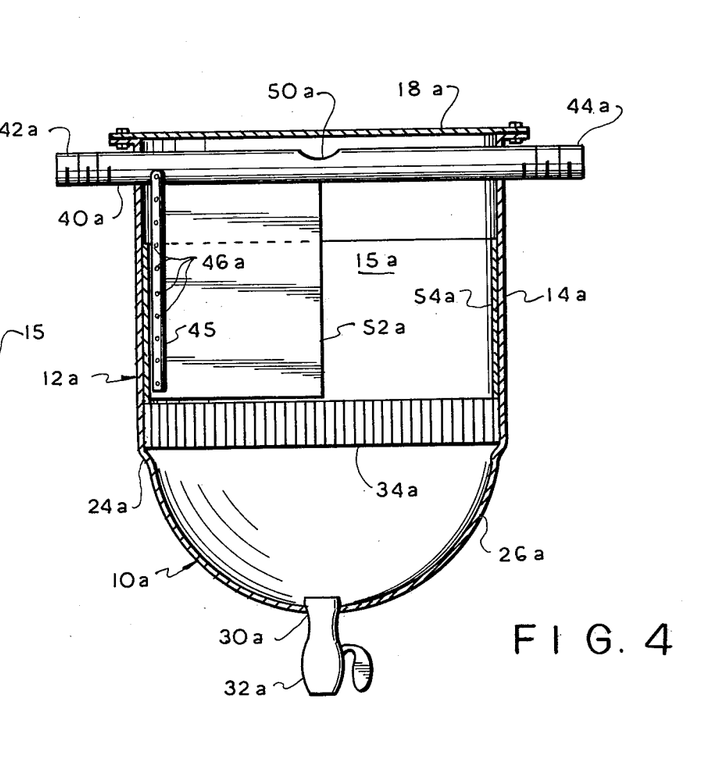
FIG. 4 is a vertical sectional view of a second embodiment of the invention as viewed from the left side of FIG. 6 looking right, e.g., along the line 4—4 looking in the direction of the arrows.
Figure 5:
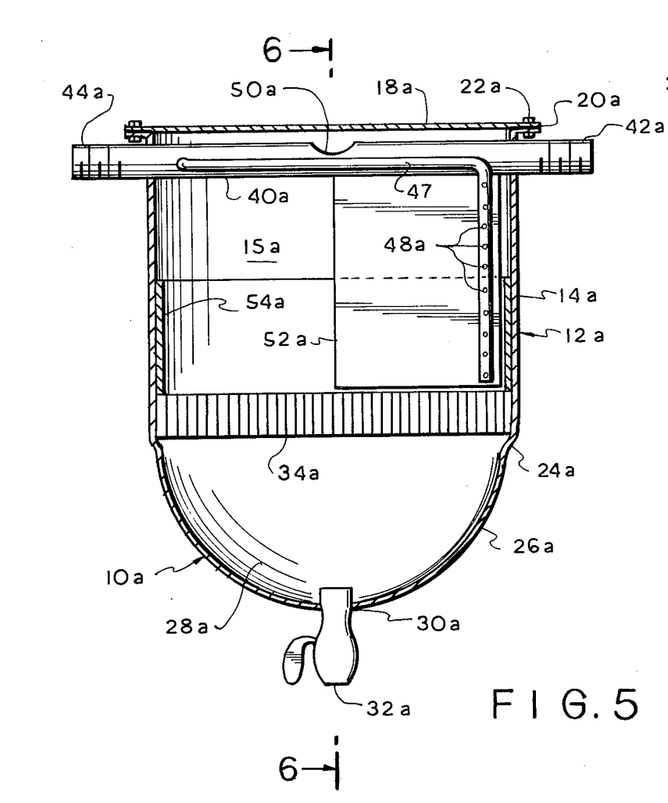
FIG. 5 is a vertical sectional view of said second embodiment as viewed from the right side of FIG. 6 looking left, e.g., along the line 5—5 looking in the direction of the arrows.
Figure 6:
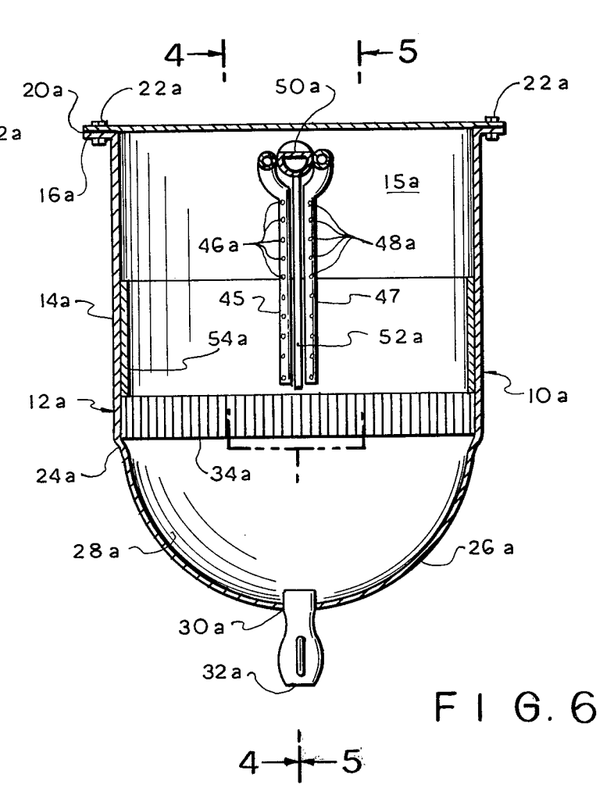
FIG. 6 is a vertical sectional view of said second embodiment as viewed from the left side of FIG. 5 looking right, e.g., along the line 6—6 looking in the direction of the arrows.

Referring now to the embodiment of FIGS. 4, 5 and 6, it will be seen that the casing 14a and partition 52a are essentially the same as in the first embodiment and the parts are designated by the same reference numerals with the postscript a and need no further description. The difference in the two embodiments lies in the means for introducing oil from the oil line of the lubricating system into the active chamber or settling zone and returning it to the oil line of the lubricating system. Referring first to FIGS. 4 and 5, it will be seen that the oil line 40a is straight and passes through the upper part of the cylindrical wall 14a with which it has fluid tight connection. Preferably the axis of the pipe 40a is a diameter of the cylinder 14a and the baffle 52a is located under the pipe as seen in FIG. 6.

The means for feeding oil into the upper active chamber 15a is an inlet pipe 45 connected at its upper end with the pipe 40a. Pipe 45 is provided with a plurality of inlet orifices 46a like those in the inlet side of the U tube 40 of the first embodiment. The lower end of pipe 45 is closed so that all of the diverted oil leaving the oil line 40a flows through the orifices 46a as streamlets in the manner previously described. Pipe 40a is also provided with a means 50a to restrict the cross-sectional area of the passageway through it downstream from the connection to pipe 45 and upstream from the connection of a discharge pipe 47 to pipe 40a into which oil withdrawn from the settling zone 15a through orifices 48a is discharged into the pipe 40a. Referring to FIG. 5, it will be seen that the pipe 47 is of inverted L-shape with the outlet orifices 48a arranged in a vertical relationship in a vertical leg of the pipe which is closed at the bottom end and with the horizontal leg of the pipe extending across the chamber to an opening in th pipe 40a downstream from the restriction 50a. The inlet end 42a and the outlet end 44a of the pipe 40a are threaded or otherwise adapted for connection to the oil line of the lubricating system of an engine, e.g., of a vehicle, in the manner previously described for the first embodiment. The operation of the embodiment of the invention illustrated in FIGS. 4, 5 and 6 is essentially the same as the operation of the device illustrated in FIGS. 1, 2 and 3.

Having thus described and illustrated the invention, what is claimed is:

1. A device for removing contaminating particles from lubricating oil in the lubricating system of a machine having a circulating oil line comprising:
    (a) a pressure tight casing forming an upper active chamber and a lower quiescent chamber;
    (b) a foraminous partition between said chambers having a plurality of vertically extending passageways communicating at their upper ends with the active chamber and at their lower ends with said quiescent chamber;
    (c) an oil pipe in said active chamber having an exposed inlet end and an exposed outlet end adapted to be secured in the oil line of said machine;
    (d) means between said ends reducing the cross-section of the passageway through said pipe;
    (e) inlet means for passing oil from said pipe upstream from said cross-section reducing means horizontally into said chamber;
    (f) outlet means for passing oil into said pipe downstream from said cross-section reducing means after removal horizontally from said chamber;
    (g) said active chamber providing an unobstructed path for horizontal laminar flow of oil from said inlet means to said outlet means; and
    (h) means for selectively withdrawing particle-laden oil from said quiescent chamber.

2. A device as set forth in claim 1 in which said inlet means is a pipe extending vertically through said active chamber adjacent to the wall thereof and has a plurality of vertically related orifices to introduce said oil horizontally into the chamber as streamlets.

3. A device as set forth in claim 1 in which said outlet means is a pipe extending vertically through said active chamber adjacent to the wall thereof and has a plurality of vertically related orifices to withdraw said oil horizontally from the chamber as streamlets.

4. A device as set forth in claim 1 in which said inlet means is a pipe extending vertically through said active chamber adjacent to the wall thereof and has a plurality of vertically related orifices to introduce said oil horizontally into the chamber as streamlets and said outlet means is a pipe extending vertically through said chamber adjacent to the wall thereof and has a plurality of vertically related orifices to withdraw said oil horizontally from the chamber as streamlets.

5. A device as set forth in claim 4 in which said inlet and outlet means are adjacent to each other and are separated by a radial baffle extending inwardly from the wall of the active chamber toward the center of the chamber a distance sufficient to produce rotational flow.

6. A device as set forth in claim 5 in which the lower ends of said inlet and outlet means are connected by a U-bend having said cross-section reducing means therein.

7. A device as set forth in claim 5 in which said inlet and outlet means are closed at the bottom and are connected to said pipe at spaced locations with said cross-section reducing means between them.

8. A device as set forth in claim 1 in which the casing of the active upper chamber is provided with an acid-reactive metallic liner.

9. A device for removing contaminating particles from lubricating oil comprising:
    (a) a pressure tight casing forming an upper active chamber and a lower quiescent chamber;

(b) a foraminous partition between said chambers having a plurality of vertically extending slender passageways communicating at their upper ends with the active chamber and at their lower ends with said quiescent chamber;

(c) a U-shaped oil pipe mounted vertically in said active chamber adjacent to the wall thereof having an exposed inlet end and an exposed outlet end extending outside said casing and adapted to be secured in an oil line of a machine;

(d) means in the U bend of said pipe reducing the cross-section of the passageway therethrough;

(e) a series of vertically related orifices in said pipe upstream from said cross-section reducing means for passing oil from said pipe into said chamber in a plurality of horizontal streamlets;

(f) a series of vertically related outlet orifices in said pipe downstream from said cross-section reducing means for passing oil from said active chamber into said pipe as a plurality of horizontal streamlets; and (g) a radial baffle extending from the axis of said active chamber between the legs of said U-shaped pipe to the wall of said chamber to cause the oil to flow in a somewhat elliptical path from the inlet means to the outlet means.

10. A device for removing contaminating particles from lubricating oil in the lubricating system of a machine having a circulating oil line comprising:

(a) a pressure tight casing forming an upper active chamber and a lower quiescent chamber;

(b) a foraminous partition between said chambers having a plurality of vertically extending slender passageways communicating at their upper ends with the active chamber and at their lower ends with said quiescent chamber;

(c) a straight oil pipe passing through the upper part of said active chamber having an exposed inlet end and an exposed outlet end adapted to be secured in the circulating oil line of said machine;

(d) means between said ends reducing the cross-section of the passageway through said pipe;

(e) a vertical inlet pipe connected with said oil pipe upstream from said cross-section reducing means extending vertically through said active chamber and having a plurality of orifices therein for introducing oil as a plurality of horizontal streamlets into said active chamber;

(f) outlet means for passing oil from said chamber connected with said oil pipe downstream from the cross-section reducing means and including an outlet pipe extending vertically through said active chamber and having a plurality of orifices therein for removing oil from said chamber as a plurality of horizontal streamlets and reintroducing the oil so removed into said oil pipe;

(g) said active chamber providing an unobstructed path for horizontal laminar flow of oil from said inlet means to said outlet means.

11. A device as set forth in claim 10 in which said inlet and outlet pipes are adjacent to each other and have a radial baffle extending between them from the wall of said chamber approximately to the axis thereof.

* * * * *